United States Patent
Kohl

[11] Patent Number: 5,984,987
[45] Date of Patent: *Nov. 16, 1999

[54] BLACK LIQUOR GASIFICATION PROCESS

[75] Inventor: Arthur L. Kohl, Woodland Hills, Calif.

[73] Assignee: Boeing North American, Inc., Seal Beach, Calif.

[*] Notice: This patent is subject to a terminal disclaimer.

[21] Appl. No.: 07/544,084

[22] Filed: Jun. 26, 1990

Related U.S. Application Data

[63] Continuation of application No. 07/058,670, May 26, 1987, abandoned, which is a continuation of application No. 06/699,498, Feb. 8, 1985, abandoned, which is a continuation of application No. 06/486,274, Apr. 18, 1983, abandoned.

[51] Int. Cl.$^6$ .................................................. C10J 3/00

[52] U.S. Cl. ........................ 48/209; 48/197 R; 48/203; 423/207; 423/DIG. 3; 162/30.1; 162/30.4; 60/39.02

[58] Field of Search .................... 48/197 R, 203, 48/209; 423/207, DIG. 3; 162/30.1, 30.11; 60/39.02

[56] References Cited

U.S. PATENT DOCUMENTS

| | | | |
|---|---|---|---|
| 1,808,773 | 6/1931 | Grondona | 423/207 |
| 2,056,266 | 10/1936 | Goodell | 423/DIG. 3 |
| 2,182,428 | 12/1939 | Fladmark | 159/48 |
| 3,718,446 | 2/1973 | Brink et al. | 48/209 |
| 3,916,617 | 11/1975 | McKenzie et al. | 60/39.02 |
| 4,682,985 | 7/1987 | Kohl | 48/197 R |

OTHER PUBLICATIONS

U.S. application S.N. 350,560 filed Feb. 22, 1982, cont of S.N. 167,502 filed Jul. 11, 1980, Barclay et al.

*Primary Examiner*—Jill Warden
*Attorney, Agent, or Firm*—Harry B. Field; Henry Kolin

[57] ABSTRACT

Aqueous black liquor is gasified in a molten salt by spraying the black liquor into an enclosed zone above the surface of a turbulent molten salt pool. The black liquor is dried by means of hot gases rising from the surface of the pool and the resulting solid particles falling into the turbulent molten salt pool are dispersed and converted into a combustible gas and a reduced melt in which sulfide comprises at least about 95% of the total sulfur present. In a preferred embodiment the product gas is purified, burned and utilized in a gas turbine.

8 Claims, 2 Drawing Sheets

BLACK LIQUOR GASIFICATION PROCESS

This is a continuation of application Ser. No. 07/058,670 filed May 26, 1987, abandoned which is a continuation of application Ser. No. 06/699,498, filed Feb. 8, 1985, since abandoned which is a continuation of application Ser. No. 06/486,274 filed Apr. 18, 1983, since abandoned.

BACKGROUND OF THE INVENTION

1. Field of the Invention

This invention relates to the gasification of black liquor. In one of its more particular aspects, this invention relates to a process in which aqueous black liquor is gasified by means of a molten salt.

2. Prior Art

In the production of pulp and paper using the sodium based sulfate and sulfite processes, digestion of wood with aqueous alkaline solutions results in the production of a byproduct which is known as spent or black liquor, hereinafter referred to as black liquor. This byproduct is considered a waste material and must be converted into useful products in order to realize economies in the overall pulping process. In particular, it is desired to regenerate sodium sulfide, which can be used to reconstitute active solutions for the pulp digestion step of the process. In addition, it is desirable to utilize black liquor as an energy source.

The most widely practiced method of processing black liquor makes use of the Tomlinson recovery furnace. In this process concentrated black liquor is burned in the furnace of a specially designed boiler to produce steam; a molten salt product called "smelt", which contains sodium carbonate and sodium sulfide; and non-combustible flue gas which, after suitable cleaning, is vented to the atmosphere. The process has served the pulp and paper industry for about fifty years, yet it has serious deficiencies. The large volume of flue gas is difficult to clean and can constitute an environmental problem; all recovered energy is in the form of steam which has limited utility; explosions can occur if the boiler tubes leak and cause water to contact the smelt; and the reduction of sulfur compounds to sulfide is incomplete.

Various other processes and improvements to the Tomlinson furnace have been used or proposed for converting black liquor to useful products.

U.S. Pat. No. 1,808,773 discloses a process which utilizes a black liquor recovery furnace having two zones of combustion. In the first high temperature combustion zone, black liquor sprayed into the furnace is dehydrated and substantially completely burned. In the second zone an additional quantity of black liquor is sprayed into the furnace along with sodium sulfate. In this zone water is removed from the black liquor by evaporation and partial combustion of the black liquor results in the formation in the bottom of the furnace of a smelting bed of spongy carbon, mixed with alkali residues from black liquor and added sodium sulfate. Reducing conditions maintained in the bottom of the furnace result in the reduction of sulfate to sulfide. Although this process results in the conversion of sodium sulfate to sodium sulfide and the combustion of black liquor, the percentage of unconverted sulfate is relatively high, ranging from 8–12%.

U.S. Pat. No. 2,056,266 describes the use of a combined smelter and boiler furnace for recovering alkali metal values from black liquor and utilizing the heat content thereof. In a fuel bed zone black liquor solids are burned in a reducing atmosphere with the result that partially burned gases rise from the fuel bed and are completely burned by introducing a stream of air into a combustion zone above the bed. The combustion zone contains boiler tubes for the production of steam. Flue gases produced in the combustion zone are allowed to rise and an inert gas is blown down on the fuel bed to prevent entrainment of solids in the gases rising from the fuel bed and to create a distinct line of separation between zones. Fused alkaline values are drained from the bottom of the bed. Although this process provides means of recovering alkali metal values from black liquor and utilizing at least some of the heat content thereof, the apparatus necessary for carrying out the process is complex and requires a separate means of drying black liquor.

U.S. Pat. No. 2,182,428 discloses a process for drying waste liquors by spraying the liquor to be evaporated upon the surface of a heat transfer medium such as an oil, tar, pitch, asphalt or wax. Since the heat transfer medium is inert, the waste liquors are merely evaporated without recovering any other useful product.

None of the processes-previously available are capable of conveniently recovering substantially the entire energy and chemical content of black liquor as high value products.

U.S. Pat. No. 3,916,617, assigned to the same assignee as the present invention, describes the use of a molten salt to produce a low Btu gas from the gasification and partial oxidation of a carbonaceous material.

In U.S. patent application Ser. No. 350,560, assigned to the same assignee as the present invention, the gasification of dried black liquor solids in a molten salt pool is described. In this process, a combustible offgas is produced and a high level of reduction of the sulfur content of the black liquor solids to sulfide is realized. The drying of black liquor to form the black liquor solids which are required as feed to the process of this invention, however, involves complex process steps in addition to the ordinary use of multiple effect evaporators which produce a concentrated black liquor having a solids content of 45–75%.

It would be desirable to provide a process which is operable upon readily available concentrated black liquor streams, which recovers in the form of a readily useable fuel the heat content of black liquor to the maximum extent and which results in a very high percentage of reduction of sulfur containing compounds present in the black liquor to sulfide.

OBJECTS OF THE INVENTION

It is accordingly an object of this invention to provide a process for gasifying aqueous black liquor in an economical manner.

It is another object of this invention to provide a process for the gasification of black liquor wherein the products of the gasification include a combustible gas.

It is another object of the present invention to provide a process for the gasification of black liquor in which the reduction of sulfur compounds to sulfide is substantially complete.

Another object of this invention is to provide a process in which a combustible gas having a heating value of at least 90 Btu per standard cubic foot is obtained in the gasification of aqueous black liquor.

It is another object of this invention to provide a process in which the dehydration, gasification and reduction of black liquor occur in a single chamber.

It is another object of this invention to provide a process in which gases produced in the gasification of an aqueous black liquor can be utilized in a gas turbine.

Other objects and advantages of this invention will be apparent from the following detailed description.

SUMMARY OF THE INVENTION

In general, the present invention provides a process for the gasification of aqueous black liquor in which there is produced a combustible gas and the sulfur content of the black liquor is substantially converted to sulfide. The process comprises introducing an oxygen-containing gas beneath the surface of a molten salt pool comprising an alkali metal carbonate and an alkali metal sulfide contained within an enclosed gasifier vessel at a rate sufficient to produce a-high degree of turbulence in the molten salt pool; introducing aqueous black liquor in the form of a coarse spray into the rising hot gases above the pool, whereby water is evaporated from the aqueous black liquor into the hot gases to produce a reduced temperature product gas and dried black liquor solids which fall onto the surface of the pool, and are dispersed therein; converting the dried black liquor solids in the pool into a hot combustible gas, which rises out of the pool, and alkali metal salts which merge with the existing salts in the pool; and withdrawing from the gasifier vessel a stream of product gas with a dry basis heating value of at least about 90 Btu/scf and a molten salt product in which the sulfur content is at least about 90% in the form of alkali metal sulfide. The process is conducted in a molten salt pool in a suitable enclosed reactor which is preferably maintained under pressure. The combustible gas produced in the process can, after suitable clean-up, be used in a gas turbine in order to utilize the energy values of the black liquor feed to the maximum extent. The sulfide produced in the molten salt pool can be recovered as an aqueous solution and recirculated to the papermaking process as green liquor.

DESCRIPTION OF THE PREFERRED EMBODIMENTS

Figure 1:
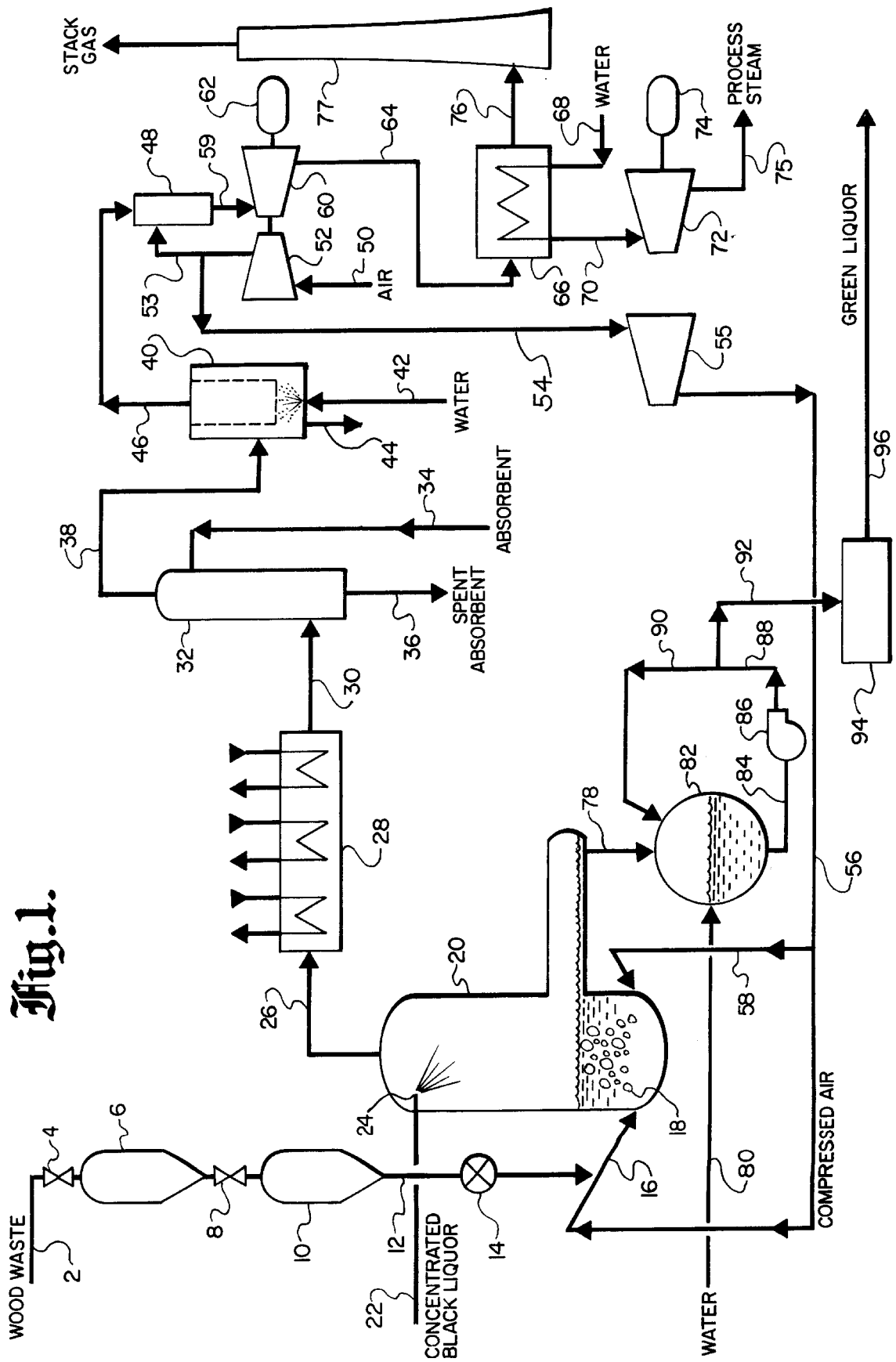
FIG. 1 is a schematic flow diagram illustrating a preferred embodiment of the process of the present invention.

In the course of the gasification of the organic components of black liquor in a molten salt pool, a combustible gas is produced which is used to dry and react with aqueous black liquor sprayed into an enclosed space above the molten salt. The dried black liquor solids formed as a result of the aqueous black liquor being contacted by the gases rising from the surface of the molten salt pool fall into the pool. Turbulence in the molten salt pool is produced by introducing an oxygen-containing gas beneath the surface thereof. The particles of dried black liquor solids are dispersed as a result of the turbulence, facilitating reaction with the oxygen introduced into the-molten salt pool and resulting in gasification of the organic content of the black liquor and reduction of oxidized sulfur compounds present in the black liquor to sulfide. Melt containing sodium sulfide is removed from the molten salt pool and quenched to provide a solution of sodium sulfide and sodium carbonate, which can be used as green liquor in the papermaking process. If desired, the aqueous sulfide solution can be further processed to remove impurities or recover valuable components therefrom. The gas produced in the gasification of black liquor in the process of this invention, which is a low or medium Btu gas, can be used for a number of purposes. A particularly preferred use is in a gas turbine combined cycle process. The gas suitably purified is burned to provide hot combustion gases which are introduced into a gas turbine which in turn powers a generator. The exhaust gases from the gas turbine are introduced into a waste heat boiler to provide steam for a steam turbine, which provides process steam and in turn powers a generator.

Black liquor can be gasified and the sulfide values recovered according to the process of the present invention. Preferably black liquor from the papermaking process should be concentrated to a solids content of about 45–75%. The use of conventional vacuum evaporators generally effects the desired concentration.

It is sometimes desirable to utilize an auxiliary fuel in addition to the concentrated black liquor feed in order to provide a steady production of combustible gas during periods when there may be insufficient feed of black liquor or to increase the heating value of gas produced from black liquor. Any carbonaceous material may be used for this purpose. For example, coal, petroleum coke, petroleum residues, wood, lignite or peat are satisfactory auxiliary fuels. Wood waste is especially preferred since it is readily available from the papermaking process along with the black liquor feed. The additional carbonaceous material is introduced beneath the surface of the molten salt pool. Introduction is facilitated by use of a gas such as compressed air, which may be used to convey the carbonaceous material into the molten salt pool. The rate of introduction of such auxiliary fuel is determined by the desired rate of production of combustible gas.

When the system is first started up, sodium carbonate alone or sodium carbonate and sodium sulfate may conveniently be used to form the initial molten salt pool. However, once steady state operation is attained, the composition of the pool will be established by the nature of the feed materials. Sodium sulfate, which is present in the original black liquor or added as a source of sulfur makeup, will be converted primarily to sodium sulfide in the molten salt. Other sulfur compounds will also be converted to sodium sulfide. The balance of the sodium compounds in the feed materials will be converted primarily to sodium carbonate. With typical sulfate and sodium sulfite process black and spent liquors the steady state molten salt pool will contain from about 15% to 85% sodium sulfide with the balance primarily sodium carbonate.

An oxygen-containing gas is introduced beneath the surface of the molten salt pool, preferably near the bottom, in order to provide the proper reaction conditions in the molten salt pool for converting the organic content of black liquor into a combustible gas. Less than the stoichiometric amount of oxygen required to completely oxidize the organic matter must be used in order to assure that a combustible gas is produced and that reducing conditions are maintained in the pool, which results in the conversion of oxidized sulfur compounds into sulfide. Turbulence produced by introduction of the oxygen-containing gas beneath the surface of the molten salt pool assures that carbonaceous material falling on the surface is thoroughly dispersed and good contact is attained with bubbles of the oxygen-containing gas. The oxygen-containing gas may be air, oxygen or oxygen-enriched air. Air is preferred because of its ready availability and its low cost compared to that of oxygen which, for practical operation, requires the presence of a nearby oxygen plant. The oxygen-containing gas is introduced under pressure to provide the desired gas flow rate above the molten salt pool. In general, the gas flow rate of the combustible gases rising above the molten salt pool should not exceed about 10 feet per second.

The pressure within the space above the molten salt pool should be within the range of about 1 to 50 atmospheres and preferably 5 to 20 atmospheres. Super-atmospheric pressures are desirable for a number of reasons. Safety of the process is enhanced, because explosions which may occur upon the mixing of molten salt and water in the quench tank are inhibited by increased pressure. The product gas volume and consequently the size of the equipment necessary for conducting the process is reduced by a factor of as much as about 20:1. In addition, salt vaporization is reduced, which eliminates the necessity for extensive clean-up of the gases produced in the gasification process. The removal of vapor phase impurities such as hydrogen sulfide from the product gas by absorption or adsorption processes is facilitated by increased gas pressure. Another advantage of operating the process under pressure is increased thermal efficiency of the process due to partial recovery of melt thermal energy which is made possible by the increase in boiling point of the quench tank solution as the pressure is increased. Another advantage is that the product gas is available at the pressure required at the gas turbine inlet. This makes the use of the process particularly advantageous in connection with the use of a gas turbine, which can also be used to provide compressed air for use in the molten salt pool.

Temperatures in the molten salt pool generally range from about 700–1400° C. and are preferably in the range of about 900–1200° C. Product gases are cooled to a temperature of about 400–700° C. during the drying process in the space above the molten salt pool. The cooling effect represents an additional benefit of this invention in that it causes droplets of melt which may be entrained in the rising gas stream to be solidified before they leave the gasifier. The resulting solid particles do not adhere to or corrode heat transfer surfaces and other equipment in the product gas processing system.

Aqueous black liquor is introduced into an enclosed zone above the surface of the molten salt pool in the form of a coarse spray. The aqueous black liquor sprayed into the enclosed zone within a suitable reactor has a high solids content, generally in the range of about 45–75% by weight of solids. The black liquor is sprayed into the reactor in a manner such that the drops of black liquor are dried by the gases rising from the surface of the molten salt pool, with the water being vaporized from the black liquor before the black liquor reaches the surface of the molten salt pool. Thus, essentially dry black liquor solid particles fall onto the surface of the molten salt pool. Spray particles may also strike the inner walls of the vessel above the molten salt pool where they adhere and are dried to form deposits of carbonaceous material and salts, which subsequently fall into the pool and undergo the desired gasification and reduction reactions. However, it is not desirable to introduce the black liquor in so fine a spray that the dried, finely divided black liquor solids are entrained in the hot gases rising from the surface of the molten salt pool. The coarseness of the spray is adjusted so that adequate drying with minimum entrainment occurs.

The gas produced in the molten salt pool as a result of the gasification of black liquor solids has a heating value over about 90 Btu/scf (dry basis) primarily due to the presence of CO, $H_2$ and $CH_4$. As the gas rises through the black liquor drying zone, its water vapor content increases and its temperature decreases as a result of the evaporation occurring from the black liquor droplets. In addition the increase in water vapor causes the water gas shift reaction to occur as follows:

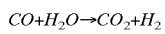

$$CO + H_2O \rightarrow CO_2 + H_2$$

This results in a change in gas composition so that the gas leaving the top of the gasifier contains less CO and more $H_2$ than that leaving the molten salt pool. However, the heating value is not materially changed by the reaction.

Purification of the gas product can be readily achieved in a number of different ways. For example, treatment in an absorber column in which the gas is washed with an absorbent such as an aqueous alkaline solution to remove $H_2S$ and a portion of the $CO_2$ or filtration in a high efficiency filter such as a fabric filter to remove particulates or scrubbing in a fume scrubber in which the gas is contacted with a spray of water or a combination of these or similar gas purification means can be used to achieve the desired purification.

The reduced sulfur values are retained in the molten salt pool as sulfide with at least about 90% and preferably at least about 95% of the sulfur content of the molten salt pool being in the form of sulfide. The sodium salts can be recovered by drawing off a stream of molten salt and quenching it in water or an aqueous solution in order to produce a green liquor stream which can be processed in the conventional manner to permit the sodium salts to be reused in the papermaking process. It is particularly desirable to quench the molten salt in a vessel which is maintained under pressure in order to avoid smelt-water explosions as pointed out above. It is also desirable to remove the stream of molten salt from the gasifier by means of an overflow port located above the injection point for oxygen-containing gas to assure that a pool of molten salt is maintained at all times and that the feed gas is forced to bubble through it.

A typical system utilizing the process of the present invention will now be described by reference to the drawing.

Referring to FIG. 1 of the drawing, there is shown a molten salt gasification reactor used with a gas turbine combined cycle system representing a preferred embodiment of the present invention. Wood waste from the papermaking process is introduced via a conduit 2 and a valve 4 into a lock hopper 6 from whence the wood waste passes via a valve 8 into a second lock hopper 10. The lock hoppers are operated with a pressurizing gas in the conventional manner to feed solids into a pressurized receiver. From lock hopper 10 the wood waste passes via a conduit 12 and a feeder valve 14 to a conduit 16 through which compressed air is flowing. The wood waste is conveyed by the compressed air and injected together with the air below the surface of a molten salt pool 18 in a reactor 20. The reactor will be described in more detail in connection with FIG. 2. Black liquor from the papermaking process having a concentration of about 45–75% solids is sprayed-into reactor 20 above the surface of molten salt pool 18 via a conduit 22 and a nozzle 24. The gaseous product from reactor 20 exits in a conduit 26 to a heat recovery system 28 and thereafter through a conduit 30 to an absorber 32. Absorbent is introduced into absorber 32 via a conduit 34. The absorbent may be weak black liquor or a conventional absorbent such as ethanolamine solution may be used to remove $H_2S$ and other undesirable components from the gas. Spent absorbent exits absorber 32 via a conduit 36. Partially purified gases from absorber 32 are conducted via a conduit 38 to a fume scrubber 40 for further purification. Water is introduced into fume scrubber 40 through a conduit 42 and exits via a conduit 44. Scrubbed gases exit via a conduit 46 to a gas turbine combustor 48. Air is supplied to combustor 48 via a conduit 50, a compressor 52 and a conduit 53. Air from compressor 52 is also fed via a conduit 54 to a booster compressor 55 and thence to a compressed air line 56, which feeds conduits 58 and 16 for introducing air into molten salt pool 18. Hot, clean, combustion gases exit combustor 48 via a conduit 59 and are fed to a gas turbine 60, which powers a generator 62 and compressor 52. Expanded gases from gas turbine 60 are conducted via a conduit 64 to a waste heat boiler 66 into which water is introduced for conversion to steam via a conduit 68. The steam produced in waste heat boiler 66 exits via a conduit 70 to a steam turbine 72, which powers a generator 74. Process steam is furnished from steam turbine 72 via a conduit 75. Exhaust gases from waste heat boiler 66 exit via a conduit 76 to a stack 77 for release to the atmosphere. Overflow melt from reactor 20 flows via a conduit 78 into a quench tank 82. Water is introduced into quench tank 82 via a conduit 80. Aqueous solution resulting from quenching the melt is removed from quench tank 82 via a conduit 84, a pump 86 and a conduit 88. Part of the solution is recycled to quench tank 82 via a conduit 90 and serves to break up the falling stream of melt as it exits conduit 78. Another part of the solution is fed from conduit 88 via a conduit 92 to green liquor storage tank 94. A conduit 96 conducts green liquor from storage tank 94 to an appropriate point in the papermaking process, for example, the causticizing stage of a sulfate process plant.

Figure 2:
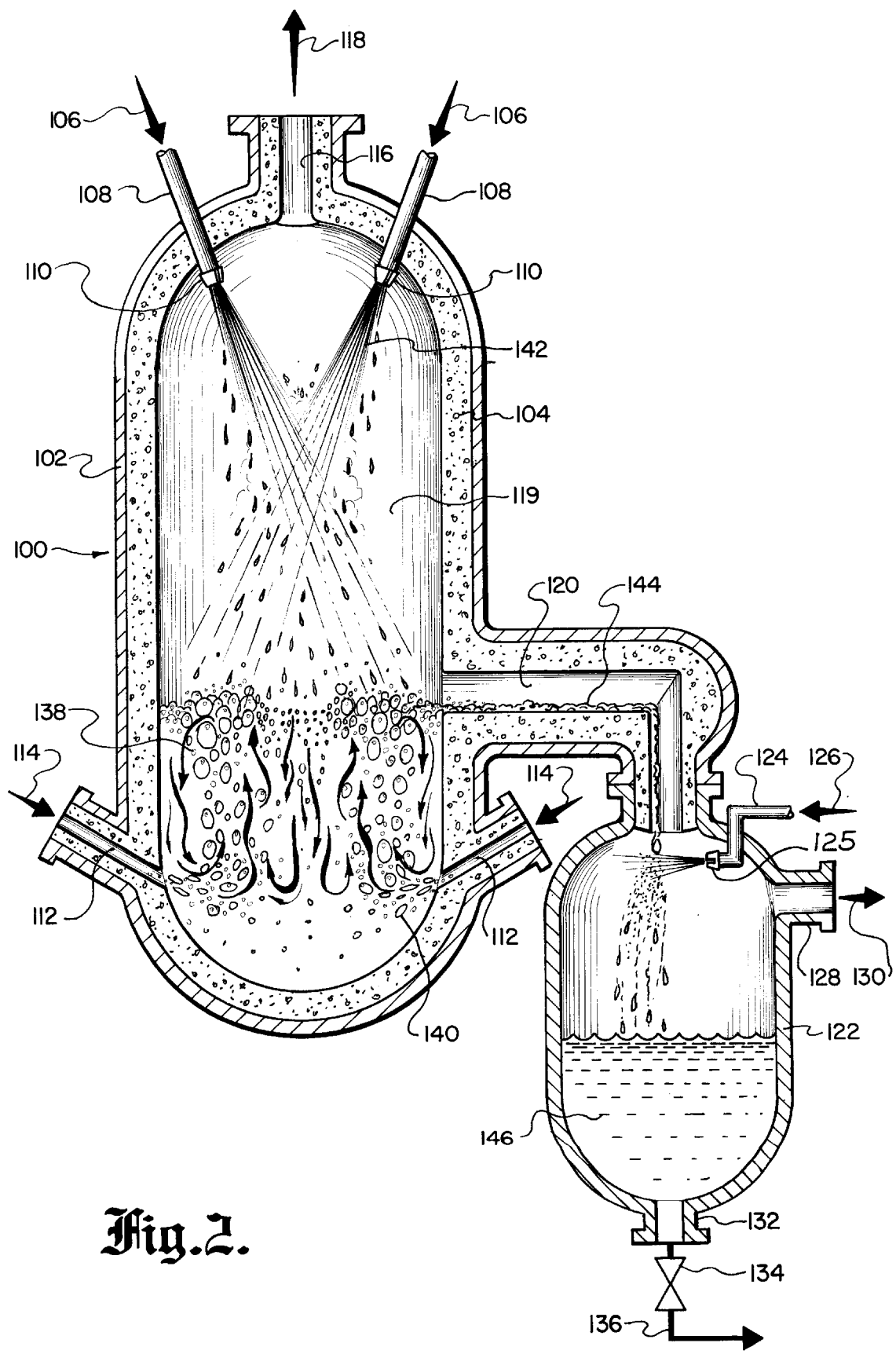
FIG. 2 is a diagrammatic view partly in cross-section of one embodiment of a reactor and associated quench tank which can be used in carrying out the process of the present invention.

FIG. 2 describes the reactor and quench tank and their operation in greater detail. A reactor 100 is shown consisting of a metal containment vessel 102 which is lined with an insulating refractory 104. Black liquor feed 106 is introduced into a pair of inlet lines 108 terminating in a pair of spray nozzles 110. Reactor 100 is also fitted with a pair of air feed nozzles 112 for introducing compressed air 114 and a product gas outlet nozzle 116 through which the product gas 118 exits from the gas space 119 in reactor 100. A distance above air feed nozzles 112 there is a molten salt overflow port 120 which is connected to a quench tank 122. Quench tank 122 is equipped with a liquid feed line 124 and shatter nozzle 125, through which water or a suitable salt solution 126, such as recycled green liquor, is sprayed adjacent the entry to quench tank 122 to break up the falling melt stream. Quench tank 122 is also equipped with a gas vent 128 near the top thereof through which exhaust gas 130 may exit. At the bottom of quench tank 122 there is a discharge nozzle 132 through which green liquor 136 can be discharged in accordance with the setting of a valve 134. Reactor 100 contains a turbulent pool of molten salt 138 in which a stream of air bubbles 140, formed as a result of the introduction of compressed air 114 into the pool of molten salt by way of air feed nozzles 112, produce a high degree of turbulence. Part of the molten salt 144 overflows into quench tank 122 where it is quenched in a quench liquor such as an aqueous salt solution 146.

In operation a turbulent pool of molten salt is formed in a pressurized reactor and aqueous black liquor is sprayed as a coarse spray into a gas space above the turbulent pool of molten salt. The spray of black liquor is converted into steam and particles of dried black liquor solids by the heat from the turbulent molten salt pool and the gases rising therefrom. The resulting solid particles drop to the surface of the molten salt pool where, because of the turbulence thereof, the particles become submerged in the molten salt pool and are thoroughly agitated and circulated within the pool, facilitating gasification and reduction. The resulting combustible gas rises above the molten salt pool in the gas space of the reactor. Sodium sulfide resulting from reduction of the sulfur content of the black liquor remains in the molten salt. Product gases are removed from the reactor and used as an energy source in systems such as a gas turbine combined cycle. The sodium salts are recovered by periodic or continuous removal of a stream of molten salt overflowing into a quench tank, where the molten salt is broken up into fine particles by means of a spray of water or salt solution introduced through a shatter nozzle, which particles fall into an aqueous quench solution. The resulting solution or slurry can be removed as product green liquor. Gases are vented from the quench tank for disposal or further use as desired.

This invention will be better understood by reference to the following examples which are intended to be illustrative of the process of the present invention and not in any way limitative thereof.

EXAMPLE 1

Black liquor having the Composition shown in Table 1 was gasified in accordance with the principles of this invention in a 6-in. diameter alumina crucible gasifier, 54 in. in height, placed in an electric furnace. An initial charge of melt was prepared made up of sodium carbonate and sodium sulfide in the ratio predicted for melt from the selected black liquor (i.e. about 70% $Na_2CO_3$ and 30% $Na_2S$), During the run, black liquor was injected downward as a coarse spray from a nozzle located about 44 in. above the surface of the pool of molten salt and air was injected near the bottom of the pool by means of a ceramic tube. The ratio of air to black liquor was set, to maintain the temperature constant at the desired level (950 to 1000° C.) and the furnace was operated to minimize heat loss from or gain to the gasifier. The pool level increased frog 6 in. to about 9.5 in. during the run due to the formation of additional melt from the black liquor feed. The degree of sulfur reduction in the melt was allowed to reach steady state before samples were taken. The results of this experiment are shown in Table 2.

TABLE 1

| CHEMICAL ANALYSIS OF BLACK LIQUOR | |
|---|---|
| Component | Wt. % |
| Solids | 64.74 |
| Organic C | 22.34 |
| Hydrogen in Organics | 2.70 |
| Inorganic C, as $Na_2CO_3$ | 3.48 |
| Na | 12.28 |
| S | 2.92 |
| $Na_2S$ | 4.58 |
| $Na_2S_2O_3$ | 1.78 |
| $Na_2SO_3$ | 0.03 |
| $Na_2SO_4$ | 1.53 |
| Na-polysulfides | 0.01 |
| NaOH | 1.25 |
| Chloride, as NaCl | 0.26 |
| Sulfated ash | 47.52 |
| pH | 12.1 |

TABLE 2

| | |
|---|---|
| Melt Temperature | 978° C. |
| Black Liquor Solids | 64.7% |
| Product Gas | Vol. % |
| Composition | Dry Basis |
| $CO_2$ | 14.2 |
| CO | 12.6 |
| $H_2$ | 18.6 |
| $CH_4$ | 2.1 |
| $C_2H_4$ | 0.3 |
| $N_2$ (and Ar) | 52.1 |
| $H_2S$ | 0.2 |
| HHV | 126 Btu/scf |

TABLE 2-continued

| Molten Salt Composition | Wt. % |
|---|---|
| $Na_2S$ | 29.9 |
| $Na_2CO_3$ | 66.4 |
| Total Sulfur (as S) | 12.8 |
| Reduction Efficiency | 98.6% |

This example shows that a product gas having a heating value (HHV) of 126 Btu/scf and a molten salt product containing sulfur which is 98.6% in the sulfide form can be obtained by means of the process of this invention.

The following example illustrates the use of a similar process in which the black liquor is introduced as an aqueous solution beneath the surface of the molten salt pool.

EXAMPLE 2

The procedure of Example 1 was followed except that the black liquor was injected with air beneath the surface of the melt. Since drying of the black liquor above the melt was not practiced, a somewhat shorter, 36 inch, crucible was used. The results of this experiment are shown in Table 3.

TABLE 3

| Melt Temperature | 977° C. |
|---|---|
| Black Liquor Solids | 64.7% |
| Product Gas Composition | Vol. % Dry Basis |
| $CO_2$ | 16.6 |
| CO | 17.4 |
| $H_2$ | 10.4 |
| $CH_4$ | 1.4 |
| $C_2H_4$ | 0.1 |
| $N_2$ (and Ar) | 62.9 |
| $H_2S$ | 0.3 |
| HHV | 70 Btu/scf |
| Molten Salt Composition | Wt. % |
| $Na_2S$ | 17.2 |
| $Na_2CO_3$ | 63.9 |
| Total Sulfur (as S) | 10.9 |
| Reduction Efficiency | 65% |

This example shows that a product gas having a heating value of only 70 Btu/scf and a molten salt product containing sulfur which is only 65% in the sulfide form can be obtained by injecting aqueous black liquor beneath the surface of the melt. These results are much less satisfactory than the heating value of 126 Btu/scf and the reduction efficiency of 98.6% realized in Example 1 using the process of the present invention.

The following example illustrates the use of a similar process in which pre-dried black liquor solids are introduced beneath the surface of the molten salt pool.

EXAMPLE 3

The procedure of Example 1 was followed except that black liquor solids were injected with air beneath the surface of the melt. As in Example 2 a 36 inch high crucible was used. The results of this experiment are shown in Table 4.

TABLE 4

| Melt Temperature | 925° C. |
|---|---|
| Black Liquor Solids | 99% |
| Product Gas Composition | Vol. % Dry Basis |
| $CO_2$ | 8.6 |
| CO | 21.0 |
| $H_2$ | 11.3 |
| $CH_4$ | 1.3 |
| $C_2H_4$ | 0.1 |
| $N_2$ (and Ar) | 57.6 |
| $H_2S$ | 0.1 |
| HHV | 119 Btu/scf |
| Molten Salt Composition | Wt. % |
| $Na_2S$ | 20.4 |
| Total Sulfur (as S) | 8.4 |
| Reduction Efficiency | 99.9% |

This example shows that a product gas having a heating value of 119 Btu/scf and a product melt containing sulfur which is 99.9% in the sulfide form can be obtained by injecting black liquor solids beneath the surface of the melt.

This example shows that a satisfactory product gas and excellent sulfur reduction can be obtained if the black liquor is dried to a solid form before being fed to a molten salt gasifier. However, this requires a difficult and costly pre-drying operation. It should also be noted that the gas produced with pre-dried black liquor solids (Example 3) contains more CO and less $H_2$ than that produced by the method of this invention (Example 1). The higher $H_2/CO$ ratio, which should preferably be greater than about 1, is an additional benefit of the invention in that it enhances the combustion characteristics and reduces the potential for carbon deposition of the product gas.

It will, of course, be realized that various modifications can be made in the design and operation of the process of this invention without departing from the spirit thereof. For example, the product gas can be used as a gas for heating or can be utilized in a steam generator. In addition, the melt can be processed in alternative ways depending upon the use to be made of the sulfide product. Thus, while the principle, preferred design and mode of operation of the invention have been explained and what is now considered to represent the best embodiment has been illustrated and described, it should be understood that, within the scope of the appended claims, the invention can be practiced otherwise than as specifically illustrated and described.

What is claimed is:

1. A process for treating a sprayable concentrated aqueous black liquor containing carbonaceous material and alkali metal sulfur compounds, said aqueous black liquor having a solids content of about 45–75% by weight, to form a combustible gas having a higher heating value of at least about 90 Btu/scf (dry basis) and a sulfide-rich melt comprising:

(a) providing a gasifier vessel maintained at a pressure of from about 1 to 50 atmospheres and containing a molten salt pool within its bottom portion which is equipped with an overflow port, said vessel having (i) a black liquor drying zone at its upper part and (ii) said molten salt pool located below the drying zone for providing gasification of black liquor solids and reduction of sulfur compounds;

(b) introducing into the top of said drying zone, in the form of a spray, the concentrated aqueous black liquor containing carbonaceous material and alkali metal sulfur compounds;

(c) evaporating water from said concentrated aqueous black liquor in said drying zone while avoiding combustion of said black liquor in said zone, by direct contact of said aqueous black liquor with the hot combustible gas in the absence of oxygen-containing gas, said combustible gas rising from said molten salt pool, to cool said combustible gas and to produce dried black liquor solids which fall onto the surface of said pool, the cooled combustible gas containing water vapor and being at a temperature below the melting point of entrained droplets of the molten salt thereby causing solidification of the entrained molten salt droplets;

(d) introducing an oxygen-containing gas beneath the surface of said molten salt pool at a rate sufficient to produce a high degree of turbulence in said pool so as to disperse said dried black liquor solids which fall onto the surface of said pool into said pool, the amount of oxygen-containing gas introduced being sufficient to cause gasification of essentially all carbonaceous material entering the pool from the drying zone to form a combustible gas but not sufficient to create oxidizing conditions in the pool, the formed combustible gas rising from said pool, the total amount of oxygen-containing gas fed to said gasifier vessel being introduced only into the bottom portion of said vessel and being less than the stoichiometric amount required for complete combustion of the black liquor feed;

(e) withdrawing said cooled combustible gas having a higher heating value of at least about 90 Btu/scf (dry basis) from an upper portion of said drying zone; and (f) withdrawing from said molten salt pool overflow port a melt in which the sulfur content is predominantly in the form of alkali metal sulfide.

2. A process according to claim 1 wherein said molten salt pool has a temperature in the range of about 900–1200° C.

3. A process according to claim 1 wherein the pressure within said gasifier vessel is in the range of about 5 to 20 atmospheres.

4. A process according to claim 1 wherein said product gas has a $H_2/CO$ ratio of greater than about 1.

5. A process according to claim 1 wherein said cooler combustible gas is at a temperature of 400–700° C.

6. A process according to claim 1 wherein the sulfur content of the melt withdrawn from said molten salt pool overflow port is at least about 90% in the form of alkali metal sulfide.

7. A process according to claim 1 wherein the melt withdrawn from said overflow port is quenched and dissolved in an aqueous solution to produce an aqueous product stream containing alkali metal sulfide.

8. A process according to claim 1 wherein said cooled combustible gas is purified to remove fume particles and hydrogen sulfide gas and is burned with air in the combustor of a gas turbine.

* * * * *